United States Patent [19]
Harshaw et al.

[11] Patent Number: 5,788,243
[45] Date of Patent: Aug. 4, 1998

[54] BIODEGRADABLE TARGET

[76] Inventors: Bob F. Harshaw, 717 S. Main, Ottawa, Kans. 66067; John E. Pollock, 24432 Pressonville Rd., Wellsville, Kans. 66092

[21] Appl. No.: 786,001

[22] Filed: Jan. 21, 1997

Related U.S. Application Data

[60] Provisional application No. 60/010,483 Jan. 23, 1996.

[51] Int. Cl.$^6$ ............................................. A41J 9/16
[52] U.S. Cl. ............................................. 273/363
[58] Field of Search ............................ 273/362, 363, 273/364, 365

[56] References Cited

U.S. PATENT DOCUMENTS

| | | |
|---|---|---|
| 3,169,767 | 2/1965 | Bingham, Jr. . |
| 3,185,480 | 5/1965 | Weyman et al. . |
| 3,207,516 | 9/1965 | Kaluzny et al. . |
| 3,572,714 | 3/1971 | Lau . |
| 3,840,232 | 10/1974 | Ludwig et al. . |
| 3,884,470 | 5/1975 | Paulson . |
| 4,077,384 | 3/1978 | Montefeltro . |
| 4,124,550 | 11/1978 | Kobayashi et al. . |
| 4,133,532 | 1/1979 | Lante-Montefeltro Della Rovere . |
| 4,271,118 | 6/1981 | Schereiner-Hansen . |
| 4,274,636 | 6/1981 | Lante-Montefeltro . |
| 4,433,842 | 2/1984 | Bertini . |
| 4,568,087 | 2/1986 | Schreiner-Hansen . |
| 4,802,676 | 2/1989 | Descos et al. . |
| 4,961,585 | 10/1990 | Crawford . |
| 5,174,581 | 12/1992 | Goodson . |
| 5,467,998 | 11/1995 | Hellings ................. 273/363 |

*Primary Examiner*—Mark S. Graham
*Attorney, Agent, or Firm*—Chase & Yakimo

[57] ABSTRACT

A biodegradable target for use in skeet/trap shooting environment comprises a cellulose wood flour of at least fifty percent (50%) of the weight of the target which is combined with water so as to form a malleable mass. Added to the mass are selected items, preferably one and one-half to five percent by weight, such as a surfactant, to facilitate the mixture of the wood flour and other elements, an organic binder to hold the elements together and a release agent to allow for release of the formed target from the mold after heating. Control agents to either hasten or retard the drying of the mixture after the heating step can be used. A brittle agent is added to the malleable mass so that the target will break apart upon impact with gun shot or the ground. A moisture repellant coating can be in the form of a resin-like shell which covers the outside of the target with slight penetration thereon. Fracture points are also incorporated into the target preferably in the form of concentric circles about the center so as to initiate an initial breakdown therealong upon impact with gun shot. The resultant biodegradable target will add moisture to the soil upon composition break down and will not deleteriously affect the surrounding flora and fauna.

37 Claims, 4 Drawing Sheets

1

BIODEGRADABLE TARGET

CROSS-REFERENCE TO RELATED APPLICATION

This application claims the benefit of the prior filed, co-pending provisional application, Ser. No. 60/010,483, filed on Jan. 23, 1996.

BACKGROUND OF THE INVENTION

This invention relates to targets for use in recreational and/or competitive shooting and, more particularly, to a method and/or construction of a biodegradable clay pigeon.

The use of clay pigeons for use in trap or skeet shooting is known. Past clay pigeons have utilized a combination of clay and a standard petroleum distillate/element such as tar pitch, asphalt or the like. However, the use of such petroleum distillates/elements is not environmentally acceptable either during the manufacture, transport and handling of the clay pigeon. The petroleum distillates may cause dermatitis upon skin contact with the target during manufacture and handling. Moreover, the shattered fragments, containing petroleum products, are not environmentally acceptable. These elements not only provide harmful effects to the surrounding flora, but are also harmful to the surrounding fauna, such as livestock, as they are not intended for consumption and/or readily digestible.

Non-toxic clay pigeons have been proposed. One patent, U.S. Pat. No. 4,568,087, suggests a non-toxic clay pigeon made of plaster, calcium carbonate, fly ash and heavy spar. However, fly ash is an extremely hard material which is not biodegradable and will interfere with an animal's digestive system.

U.S. Pat. No. 5,174,581 shows an awareness of clay pigeons not being biodegradable and possibly harmful to the environment. In that target, a composition of sugar, bird seed and water is suggested to provide a target. A crystalline matrix of heated sugar forms a syrup which envelops a lattice of bird seed with food coloring added therein. Although the rigidity of such a target is questionable, the seed attracts birds which is not desirable in trap/skeet shooting areas as the shot may in fact wound/kill birds.

In response thereto we have invented a biodegradable clay pigeon which is made up of a plurality of environmentally safe materials, including a wood cellulose flour base. The resulting clay pigeon is biodegradable and is environmentally safe as the target's composition not only releases moisture to the surrounding flora but is also digestible by the surrounding fauna.

It is therefore a general object of this invention to present a biodegradable target for use in recreational and/or conventional skeet/trap shooting.

Another object of this invention is to provide a target, as aforesaid, which does not deleteriously effect the flora and/or fauna of the surrounding shooting area.

It is another object of this invention to provide a target, as aforesaid, which is digestible by the surrounding fauna.

A further object of this invention is to provide a target which is of an initially rigid structure so as to be easily transportable and hurled from the trap.

Another object of this invention is to provide a target, as aforesaid, having a frangible characteristic so that the target is shattered upon being hit with shot.

A still further object of this invention is to provide a target, as aforesaid, which is easily visible.

Another particular object of this invention is to provide a target, as aforesaid, which has a stable trajectory.

Still a further object of this invention is to provide basic elements for use in a method of making the aforesaid target.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
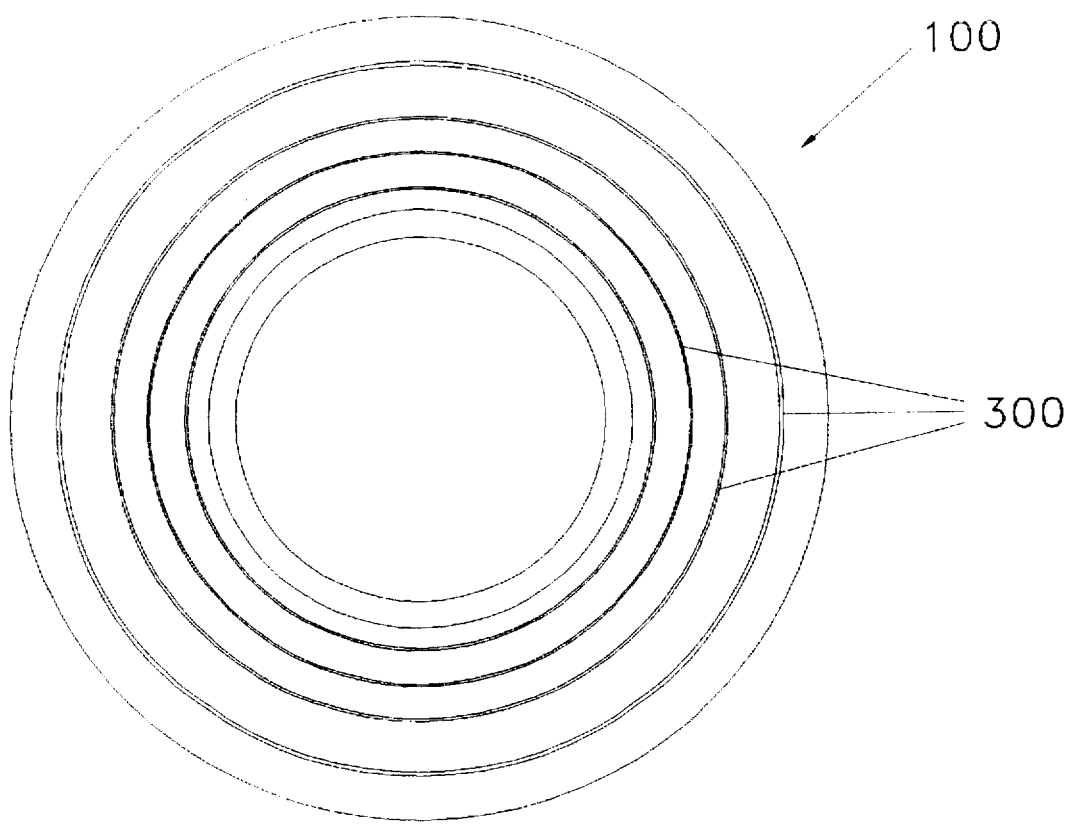
FIG. 1 is a top view of one form of the target.
Figure 2:
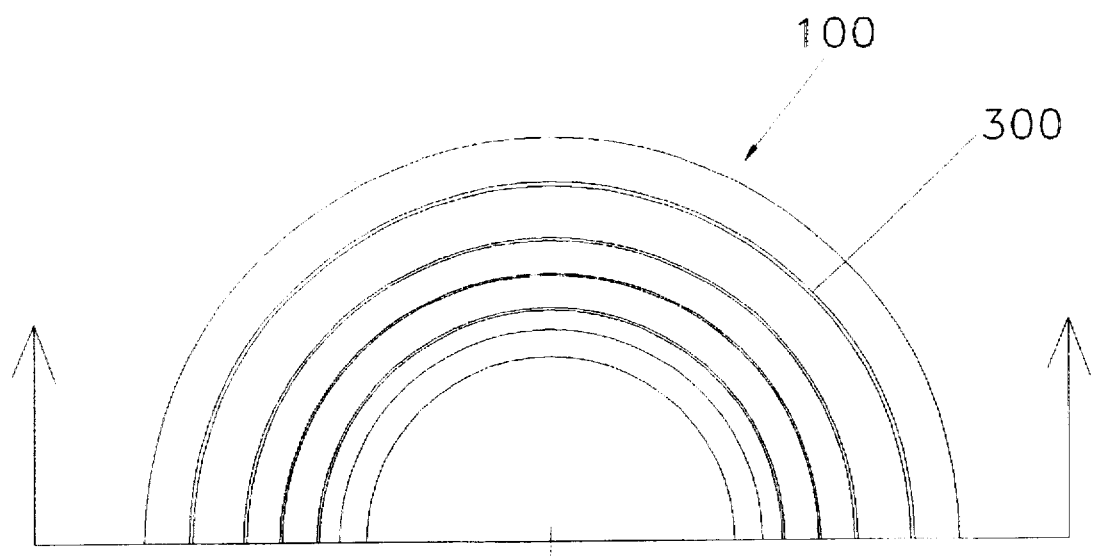
FIG. 2 is a sectional view taken along line 2—2 in FIG. 1.
Figure 2:
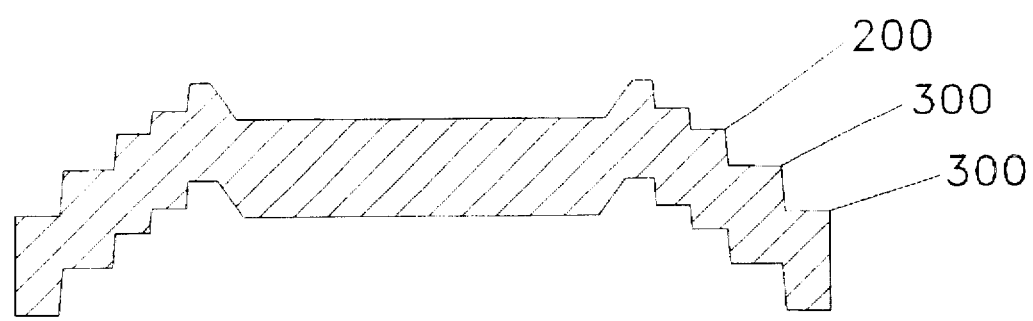
Figure 3:
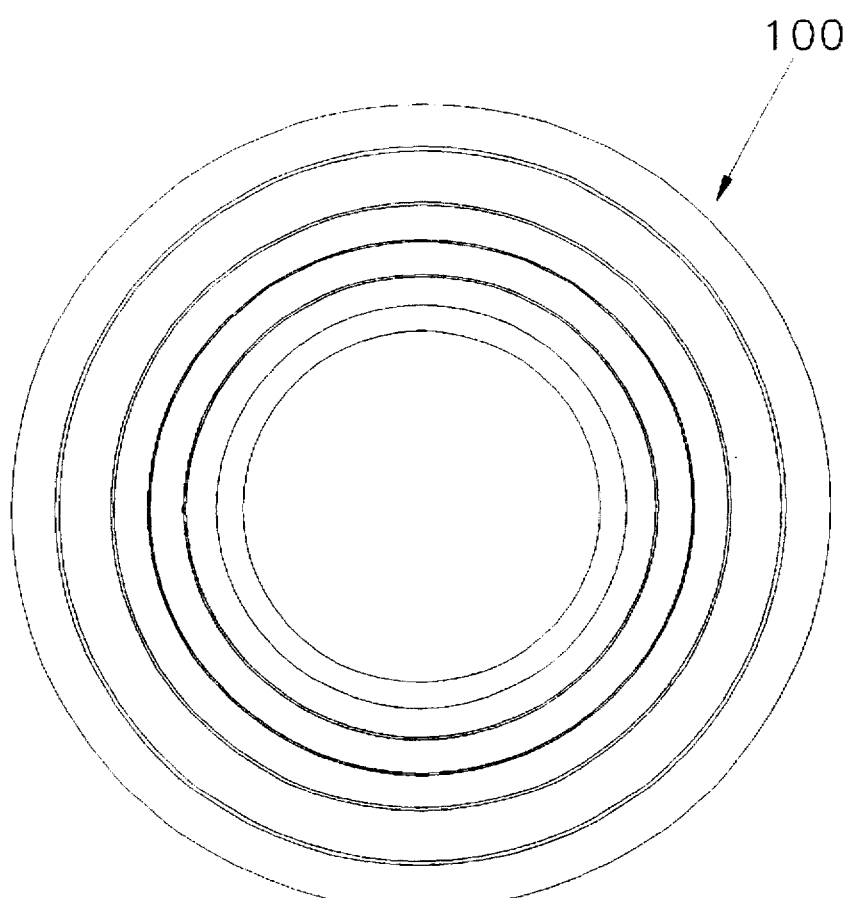
FIG. 3 is a bottom view of the target of FIG. 2.
Figure 4:
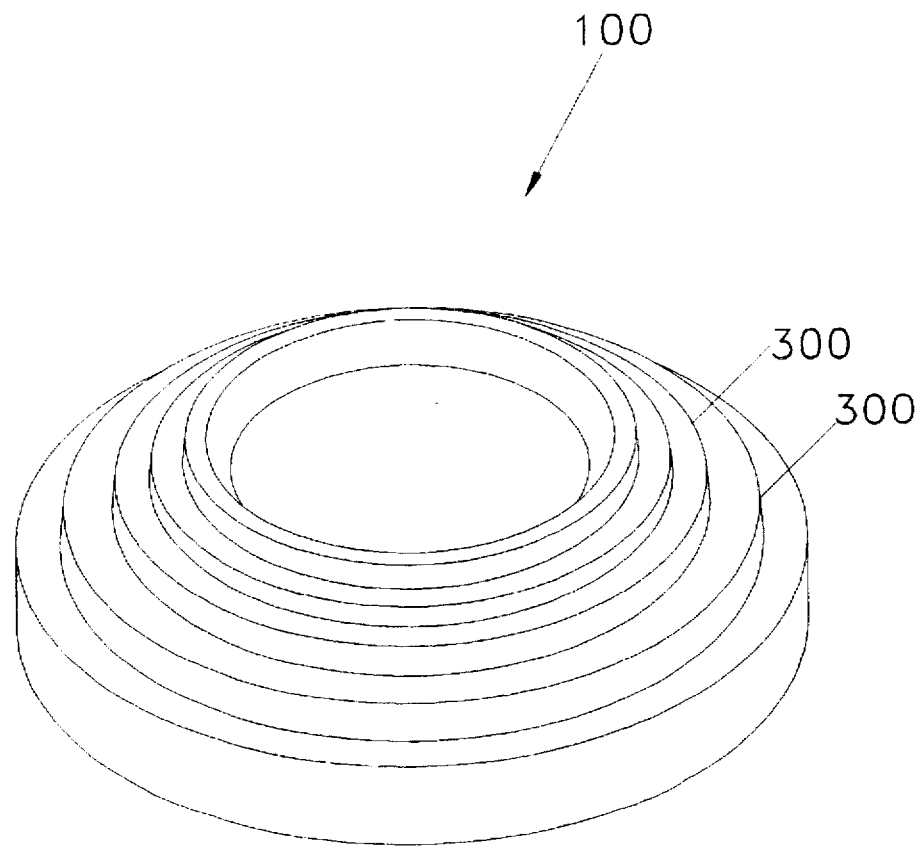
FIG. 4 is a perspective view of the target of FIG. 1.

As shown in FIG. 1, the target 100 is shown in a form for use in a skeet/trap shooting environment, the standardized dimensions understood to be approximately 110+/−2 mm, a height of 25–28 mm and a weight of 105+/−5 g. As the target 100 must be hurled by a trap, the target must be generally rigid for handling during transport and subsequent hurling. However, the target must also have a frangible characteristic such that it will shatter upon being hit by shot so as to visually indicate to the shooter that the target has been hit. Accordingly, these characteristics must be considered during selection of target elements and the percentage utilized therein.

Accordingly, it is understood that upon shot hitting the target fragments will fall to the ground therebelow. Thus, it is desirable to have a target which is biodegradable and not harm the underlying soil. As above discussed, it is understood that the use of petroleum by-products, fly ash and the like, do not present a biodegradable target. Such targets may be harmful to any flora as well as fauna that may enter the shooting area, particularly if the fauna decide to eat the target fragments.

Our embodiment proposes the use of a cellulose wood flour as the base ingredient, the flour preferably making up approximately at least 50 percent of the weight of the product and possibly as high as 95 percent, it being understood that those skilled in the art may change the percentage of wood flour used to arrive at a desired rigidity/brittleness mix. Also, if needed, water can be added so as to convert the wood flour into a malleable mass, it being understood that the water will be drawn off during the subsequent compression and/or heating of the mixture in the target mold. A cellulose modifier is added to assist in the break down of the wood flour base so as to enhance the combination of the wood flour with the water and other elements.

To this mixture a plurality of elements is added, each of said elements being approximately one and one-half to five percent by weight according to the desired final composition of the target. Included in such additional elements are surfactants which facilitate the mixture of the wood flour and other elements. An organic binder, if needed, such as an urea binder, holds all of the elements together. A release agent allows for easy release of the formed clay pigeon from the mold. Control agents, which either hasten or retard the drying of the mixture after the heating step, can be added according to the desires of the user.

As the target must be frangible a brittle agent is added, the amount being such that the target will not break apart during normal handling, transport and hurling, but only upon being hit with gun shot. A moisture repellent agent should be added to protect the target from moisture during transport and handling.

Upon mixture of these elements the elements are compacted under pressure and placed into a mold, the mold design presenting the desired target configuration. During heating and drying the composition sets into a rigid form, the previously added water being drawn from the target in an amount dependent upon the degree of temperature, length of heat application and drying time.

An exterior applied coating 200 made of an environmentally accepted resin can be applied to the desired target configuration prior to heating and cooling. This resin should slightly penetrate the body of molded material and upon curing form a protective shell albeit a generally brittle one. The shell will protect the body proper from deterioration prior to use. This coating may be colored, if desired, so as to present a clear representative of a selected bird or the like.

It is also designed that the target have a variable density generally diminishing from the exterior portions of the target to the inner portion thereof. Accordingly, the rim 250 of the target will have a proper density allowing it to be hurled from the mechanized trap without breakage but having a reduced interior density to allow dispensation upon impact by shot or the like.

Finally, points of weakness/fracture should also be designed such as along the interior concentric rings 300 so as to facilitate dispersion therein. Although such fracture points are about the rings 300 other fracture points may be chosen and incorporated into the target during the manufacture process.

Accordingly, the resulting target is a biodegradable one which will add moisture to the soil upon composition break down and will not deleteriously effect the digestion of the surrounding fauna.

We have also found that coffee grounds may be an acceptable substitute for the flour.

It is to be understood that a certain form of this invention has been illustrated and described. Thus, it enables those skilled in the art to arrive at a target composition which will produce the objects and advantages as above described.

Having thus described the invention, what is claimed as new and desired to be secured by letters patent is as follows:

1. A target adapted for trap shooting comprising:
   a body primarily formed from biodegradable matter, said body comprising:
      an organic binder of approximately one and one-half to five percent by weight to adhere elements of the body together;
      a selected percentage by weight of wood cellulose flour;
      a selected percentage by weight of water added to said flour to form a malleable mass suitable for molding and subsequent heating to present a selected configuration, whereupon to present a target susceptible to biodegradable breakdown once broken by impact.

2. The target as claimed in claim 1 wherein said wood cellulose flour percentage comprises at least fifty percent (50%) of the body.

3. The target as claimed in claim 1 wherein said body further comprises a selected percentage by weight of surfactant to facilitate the mixture of said wood flour and water.

4. The target as claimed in claim 3 wherein said surfactant percentage is approximately one and one-half to five percent.

5. The target as claimed in claim 1 wherein said body further comprises a selected percentage by weight of a release agent for allowing withdrawal of the target from a mold subsequent to said molding.

6. The target as claimed in claim 5 wherein said release agent percentage is approximately one and one-half to five percent.

7. The target as claimed in claim 1 further comprising means for regulating a drying time of the mass after said molding and heating.

8. The target as claimed in claim 1 further comprising a brittle agent in said body.

9. The target as claimed in claim 1 further comprising a moisture repellant coating about an exterior of the body whereby to protect the target from outside elements prior to said breakdown.

10. The target as claimed in claim 9 wherein said moisture coating comprises a resin-like material penetrating said body mass.

11. The target as claimed in claim 1 further comprising fracture points in said body to initiate separation of said target thereat upon said impact.

12. The target as claimed in claim 11 wherein said selected configuration is a disc.

13. The target as claimed in claim 11 wherein said fracture points are circular rings about a center of said body.

14. A target adapted for trap shooting comprising:
   a body primarily formed from biodegradable matter, said body comprising:
      a selected percentage by weight of wood cellulose flour;
      a selected percentage by weight of water added to said flour to form a malleable mass suitable for molding and subsequent heating to present a selected configuration, whereupon to present a target susceptible to biodegradable breakdown once broken by impact;
      a moisture repellant coating about an exterior of the body whereby to protect the target from outside elements prior to said breakdown.

15. The target as claimed in claim 14 wherein said wood cellulose flour percentage comprises at least fifty percent (50%) of the body.

16. The target as claimed in claim 14 wherein said body further comprises a selected percentage by weight of surfactant to facilitate mixture of said wood flour and water.

17. The target as claimed in claim 16 wherein said surfactant percentage is approximately one and one-half to five percent.

18. The target as claimed in claim 14 wherein said body further comprises a selected percentage by weight of an organic binder to adhere elements of the body together.

19. The target as claimed in claim 18 wherein said organic binder percentage is approximately one and one-half to five percent.

20. The target as claimed in claim 14 wherein said body further comprises a selected percentage by weight of a release agent for allowing withdrawal of the target from a mold subsequent to said molding.

21. The target as claimed in claim 20 wherein said release agent percentage is approximately one and one-half to five percent.

22. The target as claimed in claim 14 further comprising means for regulating a drying time of the mass after said molding and heating.

23. The target as claimed in claim 14 further comprising a brittle agent in said body.

24. The target as claimed in claim 14 further comprising fracture points in said body to initiate separation of said target thereat upon said impact.

25. The target as claimed in claim 24, wherein said fracture points are circular rings about a center of said body.

26. A target adapted for trap shooting comprising:
   a body primarily formed from biodegradable matter, said body comprising:
   a selected percentage by weight of wood cellulose flour;
   a selected percentage by weight of water added to said flour to form a malleable mass suitable for molding and subsequent heating to present a selected configuration, whereupon to present a target susceptible to biodegradable breakdown once broken by impact;
   a moisture repellant coating of a resin like material about an exterior of the body and penetrating said body mass whereby to protect the target from outside elements prior to said breakdown.

27. The target as claimed in claim 26 wherein said wood cellulose flour percentage comprises at least fifty percent (50%) of the body.

28. The target as claimed in claim 26 wherein said body further comprises a selected percentage by weight of surfactant to facilitate mixture of said wood flour and water.

29. The target as claimed in claim 28 wherein said surfactant percentage is approximately one and one-half to five percent.

30. The target as claimed in claim 26 wherein said body further comprises a selected percentage by weight of an organic binder to adhere elements of the body together.

31. The target as claimed in claim 30 wherein said organic binder percentage is approximately one and one-half to five percent.

32. The target as claimed in claim 26 wherein said body further comprises a selected percentage by weight of a release agent for allowing withdrawal of the target from a mold subsequent to said molding.

33. The target as claimed in claim 32 wherein said release agent percentage is approximately one and one-half to five percent.

34. The target as claimed in claim 26 further comprising means for regulating a drying time of the mass after said molding and heating.

35. The target as claimed in claim 26 further comprising a brittle agent in said body.

36. The target as claimed in claim 26 further comprising fracture points in said body to initiate separation of said target thereat upon said impact.

37. The target as claimed in claim 36 wherein said fracture points are circular rings about a center of said body.

* * * * *